(12) United States Patent
Wee et al.

(10) Patent No.: US 11,480,825 B2
(45) Date of Patent: Oct. 25, 2022

(54) POLARIZER AND OPTICAL DISPLAY DEVICE COMPRISING SAME

(71) Applicant: Samsung SDI Co., Ltd., Yongin-si (KR)

(72) Inventors: Dong Ho Wee, Suwon-si (KR); Jeong Ho Lee, Suwon-si (KR); Yong Un Jung, Suwon-si (KR); Young Oh, Suwon-si (KR); Young Hyun Ju, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/489,944

(22) PCT Filed: Nov. 30, 2017

(86) PCT No.: PCT/KR2017/013937
§ 371 (c)(1),
(2) Date: Aug. 29, 2019

(87) PCT Pub. No.: WO2018/164348
PCT Pub. Date: Sep. 13, 2018

(65) Prior Publication Data
US 2020/0073172 A1    Mar. 5, 2020

(30) Foreign Application Priority Data
Mar. 8, 2017  (KR) .......................... 10-2017-0029750

(51) Int. Cl.
*G02F 1/1335* (2006.01)
*G02B 5/30* (2006.01)
*G02F 1/1339* (2006.01)

(52) U.S. Cl.
CPC ..... *G02F 1/133528* (2013.01); *G02B 5/3033* (2013.01); *G02F 1/1339* (2013.01); *G02F 1/133526* (2013.01)

(58) Field of Classification Search
CPC ......... G02F 1/133528; G02F 1/133502; G02F 1/133526
See application file for complete search history.

(56) References Cited

U.S. PATENT DOCUMENTS

2007/0153377 A1* 7/2007 Goto ................. G02F 1/133524
359/460
2008/0129933 A1* 6/2008 Nishida ............ G02F 1/133502
349/96

(Continued)

FOREIGN PATENT DOCUMENTS

CN    105929476 A    9/2016
JP    2006-251659 A   9/2006

(Continued)

OTHER PUBLICATIONS

Chinese Office action from corresponding Chinese Patent Application No. 201780088079.X, Chinese Office action dated Feb. 9, 2021 (7 pgs.).

*Primary Examiner* — Alexander P Gross
(74) *Attorney, Agent, or Firm* — Lewis Roca Rothgerber Christie LLP

(57) ABSTRACT

A polarizer and optical display device comprising the same are disclosed. Specifically, the polarizer comprises: a polarizing film; and a contrast ratio improving film formed on one surface of the polarizing film, wherein the contrast ratio improving film comprises a contrast ratio improving layer consisting of a first protective layer, and first and second resin layers facing each other, and the first resin layer has: pattern parts having two or more optical patterns on one surface thereof that faces the second resin layer and a flat (Continued)

part between the optical pattern and another immediately adjacent optical pattern.

17 Claims, 2 Drawing Sheets

(56) References Cited

U.S. PATENT DOCUMENTS

| | | | | |
|---|---|---|---|---|
| 2008/0144180 | A1* | 6/2008 | Nishida | H01J 11/12 359/601 |
| 2009/0213593 | A1* | 8/2009 | Foley | H01L 51/5284 362/333 |
| 2011/0058389 | A1* | 3/2011 | Shiau | G02F 1/133605 362/607 |
| 2014/0014938 | A1* | 1/2014 | Harai | H01L 51/5271 257/40 |
| 2016/0252665 | A1* | 9/2016 | Lee | G02B 5/3083 359/489.07 |

FOREIGN PATENT DOCUMENTS

| | | |
|---|---|---|
| JP | 2009-86400 A | 4/2009 |
| KR | 10-2008-0038778 A | 5/2008 |
| KR | 10-2016-0002410 A | 1/2016 |
| KR | 10-1659241 B1 | 9/2016 |
| KR | 10-2016-0129220 A | 11/2016 |

* cited by examiner

[FIG. 1]
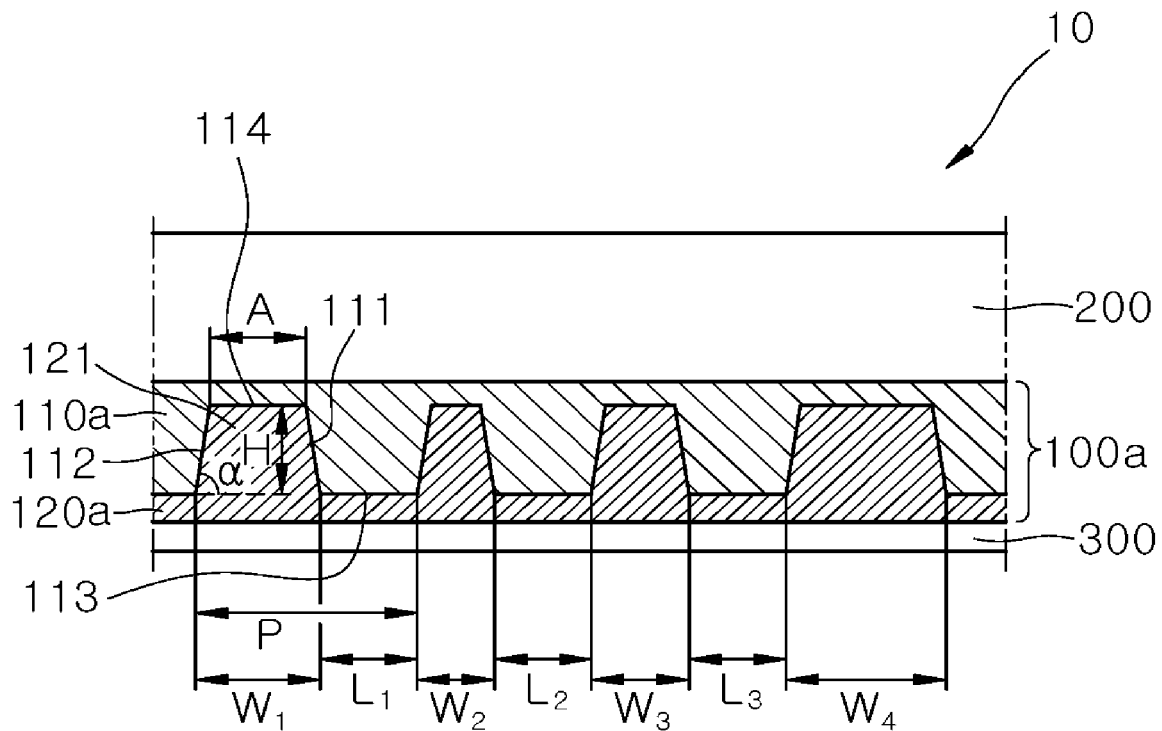
[FIG. 2]
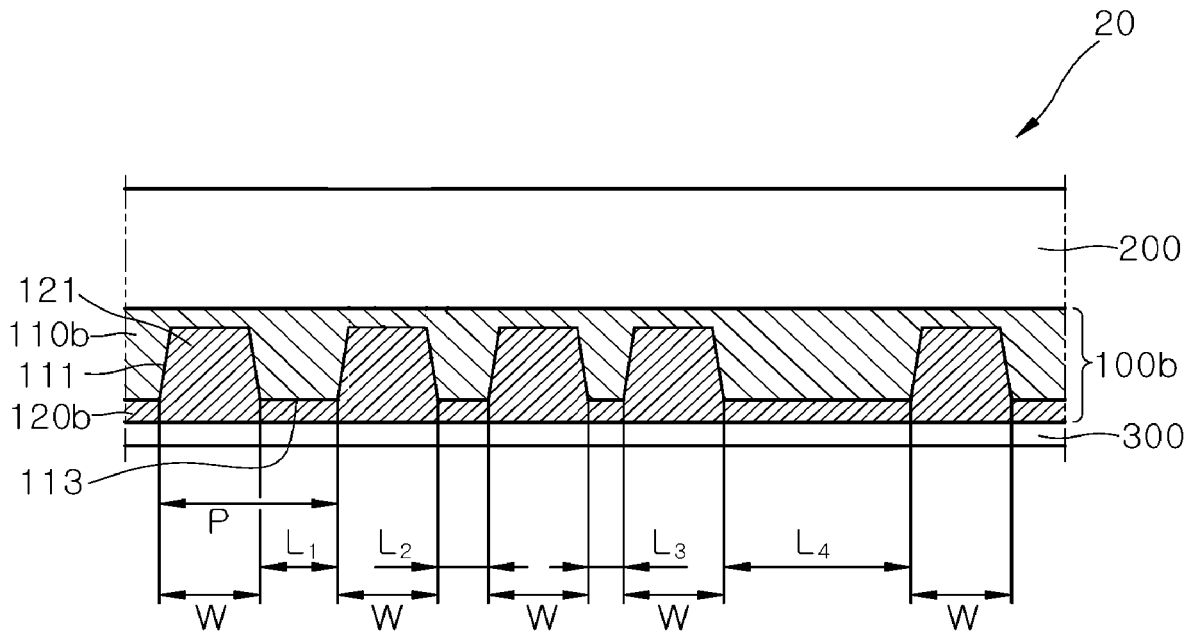

[FIG. 3]
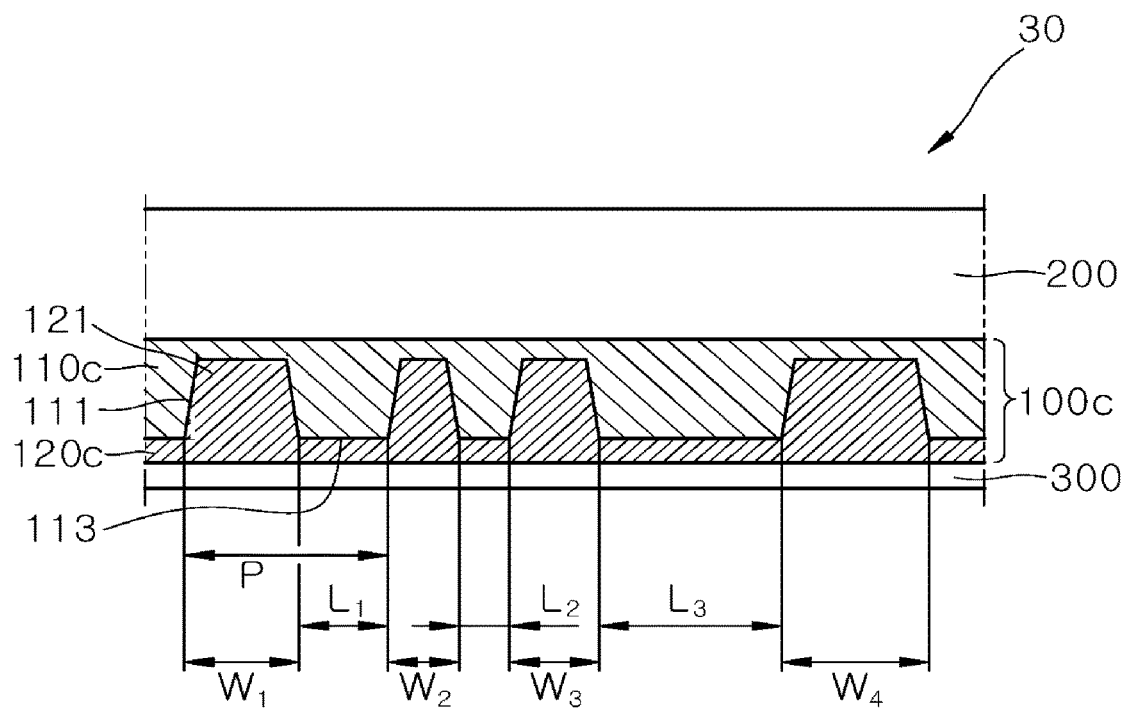
[FIG. 4]
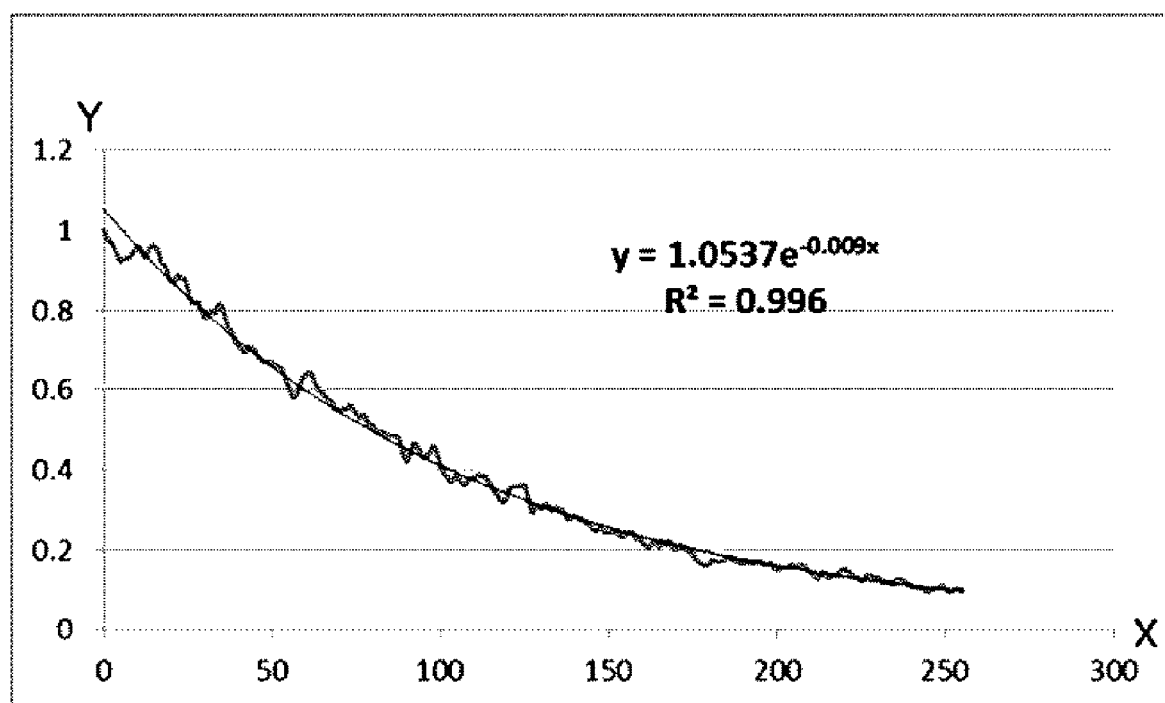

POLARIZER AND OPTICAL DISPLAY DEVICE COMPRISING SAME

CROSS-REFERENCE TO RELATED APPLICATION(S)

This application is a U.S. National Phase Patent Application of International Application Number PCT/KR2017/013937, filed on Nov. 30, 2017, which claims priority to Korean Patent Application Number 10-2017-0029750, filed on Mar. 8, 2017, the entire contents of both of which are incorporated herein by reference.

TECHNICAL FIELD

The present invention relates to a polarizing plate and an optical display including the same.

BACKGROUND ART

A liquid crystal display is operated to emit light through a liquid crystal panel after receiving the light from a backlight unit. Thus, the liquid crystal display provides a good front contrast ratio (CR). However, the liquid crystal display has a poor side contrast ratio. Therefore, the side contrast ratio of the liquid crystal display needs to be increased while minimizing reduction in the front contrast ratio thereof in order to improve visibility.

A liquid crystal display may also be maintained in a non-driven state. In addition, the liquid crystal display can be displayed in a driven state or in a non-driven state for the purpose of product demonstration or product sales. When a screen of the liquid crystal display in a non-driven state receives external light, rainbow spots or mura can be generated on the screen or reflected light can be split, thereby causing deterioration in black visibility and appearance of the liquid crystal display. Black visibility means the degree of black on the screen of the liquid crystal display in a non-driven state.

Therefore, there is a need for a polarizing plate which can improve both front and side contrast ratios of the liquid crystal display upon operation while preventing deterioration in appearance when the liquid crystal display is turned off.

One example of the background technique is disclosed in Japanese Unexamined Patent Publication No. 2006-251659A.

DISCLOSURE

Technical Problem

It is one object of the present invention to provide a polarizing plate capable of preventing deterioration in external appearance of a screen of an optical display caused by external light upon non-operation of the optical display.

It is another object of the present invention to provide a polarizing plate capable of preventing generation of mura on a screen of an optical display caused by external light while improving black visibility upon non-operation of the optical display.

It is a further object of the present invention to provide a polarizing plate capable of improving both front and side contrast ratios and capable of improving the side contrast ratio while minimizing reduction in front contrast ratio upon operation of an optical display.

Technical Solution

In accordance with one aspect of the present invention, a polarizing plate includes: a polarizing film and a contrast-improving film formed on one surface of the polarizing film, wherein the contrast-improving film includes a first protective layer and a contrast-improving layer including a first resin layer and a second resin layer facing each other, the first resin layer including a patterned portion formed on one surface thereof facing the second resin layer and including at least two optical patterns and a flat section between adjacent optical patterns, the optical patterns having a base angle α of about 75° to about 90°, the patterned portion satisfying Equation 2:

$$1 < P/W \leq 10 \qquad \text{<Equation 2>}$$

(wherein P is the sum of the maximum width of a corresponding optical pattern and the width of the flat section directly adjoining the corresponding optical pattern (unit: μm), and W is the maximum width of the corresponding optical pattern (unit: μm)), the patterned portion satisfying at least one of the following conditions (i) and (ii):

(i) the optical patterns have a different maximum width than at least one of the optical patterns adjacent to each other; and (ii) the flat section has a different width than at least one of the flat sections adjacent to each other; and wherein the polarizing plate has a determination coefficient of black visibility of about 0.985 or more.

In accordance with another aspect of the present invention, an optical display includes the polarizing plate according to the present invention.

Advantageous Effects

The present invention provides a polarizing plate capable of preventing deterioration in external appearance of a screen of an optical display caused by external light upon non-operation of the optical display.

The present invention provides a polarizing plate capable of preventing generation of mura on a screen of an optical display caused by external light while improving black visibility upon non-operation of the optical display.

The present invention provides a polarizing plate capable of improving both front and side contrast ratios and capable of improving the side contrast ratio while minimizing reduction in the front contrast ratio upon operation of an optical display.

BRIEF DESCRIPTION OF DRAWINGS

FIG. 1 is a sectional view of a polarizing plate according to one embodiment of the present invention.

FIG. 2 is a sectional view of a polarizing plate according to another embodiment of the present invention.

FIG. 3 is a sectional view of a polarizing plate according to a further embodiment of the present invention.

FIG. 4 is a graph for calculation of determination coefficient of black visibility upon non-operation of the optical display of Example 5.

BEST MODE

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification.

Herein, spatially relative terms such as "upper" and "lower" are defined with reference to the accompanying drawings. Thus, it will be understood that the term "upper surface" can be used interchangeably with the term "lower surface", and when an element such as a layer or a film is referred to as being placed "on" another element, it can be directly placed on the other element, or intervening element(s) may be present. On the other hand, when an element is referred to as being placed "directly on" another element, there are no intervening element(s) therebetween.

Herein, the terms "horizontal direction" and "vertical direction" mean a longitudinal direction and a transverse direction of a rectangular screen of a liquid crystal display, respectively. Herein, "side" refers to a region in which θ ranges from 60° to 90° in the spherical coordinate system represented by (φ, θ) in which a front side is indicated by (0°, 0°), a left end point is indicated by (180°, 90°), and a right end point is indicated by (0°, 90°) with reference to the horizontal direction.

Herein, the term "top portion" refers to the highest portion in an engraved optical pattern.

Herein, "aspect ratio" refers to a ratio of maximum height of an optical pattern to maximum width thereof (maximum height/maximum width).

Herein, "pitch" means the sum of the maximum width W of one optical pattern and the width L of one flat section.

Herein, "in-plane retardation (Re)" is a value measured at a wavelength of 550 nm and is represented by Equation A:

$$Re=(nx-ny)\times d \qquad \text{<Equation A>}$$

wherein nx and ny are the indices of refraction in the slow and fast axes of a corresponding protective layer or base layer at a wavelength of 550 nm, respectively, and d is the thickness (unit: nm) of the protective layer or base layer.

Herein, the term "(meth)acryl" refers to acryl and/or methacryl.

Herein, the term "black visibility" means the degree of black on a screen of an optical display upon non-operation without generating mura due to external light. Higher determination coefficient of black visibility indicates better black visibility.

Herein, "determination coefficient of black visibility" was measured on a liquid crystal display manufactured using a polarizing plate, as a viewer side polarizing plate, on which the determination coefficient of black visibility would be measured, with a fluorescent lamp placed at a predetermined height above a screen of the liquid crystal display so as to correspond to the middle location of the screen in the longitudinal direction. In a non-driven state of the liquid crystal display, the fluorescent lamp was turned on to measure the intensity of reflected light on each of pixels obtained by partitioning the screen of the liquid crystal display into pixels. The intensity (I) of the reflected light measured on each pixel was divided by the maximum value of the intensity (I) of the measured reflected light to obtain a squared value in each pixel. A graph was obtained by arranging pixel unit locations on the x-axis and the obtained squared values on the y-axis, and was normalized by a statistical analysis method. From normalization, a trend line and residuals of an exponential function ($y=ae^{bx}$) were obtained. The residuals were used as the determination coefficient of black visibility. A determination coefficient of black visibility approaching 1 indicates better external appearance and a lower determination coefficient of black visibility means larger fluctuation of the intensity of reflected light providing apparent diffraction light.

The present invention is based on features of a polarizing plate that includes a contrast-improving layer including a patterned portion satisfying at least one of conditions (i) and (ii), satisfies the following Equation 2 to improve both front contrast ratio and side contrast ratio and to improve the side contrast ratio while minimizing reduction in the front contrast ratio upon operation of an optical display, and satisfies the following Equations 2 and 3 at the same time to prevent generation of mura on a screen of an optical display caused by external light while improving black visibility upon non-operation of the optical display:

(i) Optical patterns have a different maximum width than at least one of adjacent optical patterns; and (ii) A flat section has a different width than at least one of adjacent flat sections.

Hereinafter, a polarizing plate according to one embodiment of the present invention will be described with reference to FIG. 1. FIG. 1 is a sectional view of a polarizing plate according to one embodiment of the present invention.

Referring to FIG. 1, the polarizing plate 10 according to the embodiment includes a polarizing film 300 and a contrast-improving film, which includes a contrast-improving layer 100a and a first protective layer 200.

In the polarizing plate 10, the contrast-improving film is stacked on the polarizing film 300. The polarizing plate 10 may be used as a viewer-side polarizing plate in a liquid crystal display. Herein, the term "viewer-side polarizing plate" means a polarizing plate disposed at a viewer side and opposite a light source with respect to a liquid crystal panel. A liquid crystal display is affected by external light upon non-operation. The polarizing plate 10 includes the contrast-improving film described in detail below. Thus, a liquid crystal display including the polarizing plate according to this embodiment allows external light to be diffracted and mixed upon non-operation, thereby significantly improving black visibility of a screen thereof. Specifically, the polarizing plate may have a determination coefficient of black visibility of about 0.985 or more, preferably about 0.985 to about 1.000. The contrast-improving film of the polarizing plate 10 can improve the side contrast ratio upon operation of the liquid crystal display.

Contrast-Improving Film

The contrast-improving film is formed on the polarizing film 300. The contrast-improving film is formed on a light exit surface of the polarizing film 300.

The contrast-improving film is composed of the first protective layer 200 and a contrast-improving layer 100a, which is a stacked structure of a first resin layer 110a and a second resin layer 120a facing each other. In the contrast-improving film, the second resin layer 120a, the first resin layer 110a, and the first protective layer 200 are sequentially stacked on the polarizing film 300.

The first resin layer 110a may be directly formed on the second resin layer 120a. Herein, the expression "directly formed on" means that any adhesive layer, bonding layer or adhesive bonding layer is not interposed between the first resin layer 110a and the second resin layer 120a. The first resin layer 110a can improve light diffusion effects by diffusing light reaching the second resin layer 120a.

The first resin layer 110a includes a patterned portion which is formed on one surface thereof facing the second resin layer 120a and includes optical patterns and a flat section disposed between adjacent optical patterns. Accordingly, the contrast-improving film can diffuse polarized light received from the polarizing film 300, thereby improving relative brightness at the front side while improving both the front contrast ratio and the side contrast ratio at the same time. In addition, the contrast-improving film can increase the side contrast ratio while minimizing reduction in the front contrast ratio, can reduce a difference between the front contrast ratio and the side contrast ratio, and can improve the contrast ratio at the same side viewing angle and the same front viewing angle.

The patterned portion may satisfy condition (i). Referring to FIG. 1, with reference to the width direction of the optical patterns of the patterned portion, the maximum width of the first optical pattern is indicated by $W_1$, the maximum width of the second optical pattern is indicated by $W_2$, the maximum width of the third optical pattern is indicated by $W_3, \ldots$, the maximum width of the $(n-2)^{th}$ optical pattern is indicated by $W_{n-2}$, the maximum width of the $(n-1)^{th}$ optical pattern is indicated by $W_{n-1}$, and the maximum width of the $n^{th}$ optical pattern is indicated by $W_n$. Here, n is an integer of 4 to 500,000. Although FIG. 1 shows a polarizing plate including four optical patterns, it should be understood that the present invention is not limited thereto.

The patterned portion may be formed to satisfy the following Equations 1-1, 1-2, and 1-3, and the flat sections may have the same width L.

$$W_{n-1} \neq W_n \qquad \text{<Equation 1-1>}$$

$$W_{n-2} \neq W_n \qquad \text{<Equation 1-2>}$$

$$W_{n-3} \neq W_n \qquad \text{<Equation 1-3>}$$

(wherein, with reference to the width direction of the optical patterns, $W_{n-3}$ indicates the maximum width of the $(n-3)^{th}$ optical pattern, $W_{n-2}$ indicates the maximum width of the $(n-2)^{th}$ optical pattern, $W_{n-1}$ indicates the maximum width of the $(n-1)^{th}$ optical pattern, and $W_n$ indicates the maximum width of the $n^{th}$ optical pattern; and n is an integer of 4 to 500,000).

Preferably, n is an integer of 5,000 to 200,000.

Preferably, in the polarizing plate, adjacent optical patterns have different maximum widths to extinguish external light through diffraction and mixing of the external light by the optical patterns, thereby further improving black visibility.

In one embodiment, the optical patterns may have different maximum widths.

In the patterned portion, each of the optical patterns 111 may have a base angle α of about 75° to about 90°. The base angle α refers to an angle formed between an inclined surface 113 of each optical pattern 111 and a line along the maximum widths $W_1$, $W_2$, $W_3$, $W_4$ of the optical patterns 111. Within this range, the contrast-improving film can improve relative brightness at the front side, improve both the front contrast ratio and the side contrast ratio at the same time, reduce a difference between the front contrast ratio and the side contrast ratio, and improve the contrast ratio at the same side viewing angle and the same front viewing angle. Although FIG. 1 shows the structure wherein each of the optical patterns has the same base angle at both sides thereof, the optical pattern may have different base angles so long as the base angles range from about 75° to about 90° as described above. Preferably, the optical pattern has the same base angle.

In the patterned portion, each of the optical patterns and the flat section directly adjoining the corresponding optical pattern may satisfy Equation 2. With this structure, the contrast-improving film can improve relative brightness at the front side, improve both the front contrast ratio and the side contrast ratio at the same time, reduce a difference between the front contrast ratio and the side contrast ratio, and improve the contrast ratio at the same side viewing angle and the same front viewing angle.

$$1 < P/W \leq 10 \qquad \text{<Equation 2>}$$

wherein P is the sum of the maximum width of the corresponding optical pattern and the width of the flat section directly adjoining the optical pattern (unit: μm), and W is the maximum width of the optical pattern (unit: μm).

Since the optical patterns satisfy at least one of Equations 1-1, 1-2 and 1-3, the optical patterns of the patterned portion have different values of Equation 2. When the maximum value and the minimum value of Equation 2 are [P/W]max and [P/W]min, respectively, the patterned portion may satisfy the following Equation 3, thereby significantly improving black visibility while preventing generation of mura due to external light upon non-operation of a liquid crystal display.

$$1.5 < [P/W]\max/[P/W]\min < 10 \qquad \text{<Equation 3>}$$

wherein [P/W]max is the maximum value of P/W represented by Equation 2, and

[P/W]min is the minimum value of P/W represented by Equation 2.

For example, [P/W]max/[P/W]min may range from 1.55 to less than 10, preferably greater than 2 to less than 10. Within this range, the liquid crystal display can have a black visibility of about 0.995 or more.

Next, the optical patterns will be described in detail.

The optical patterns 111 may be engraved optical patterns each having a first surface 114 formed at the top portion thereof and at least one inclined surface 112 connected to the first surface 114. The first surface 114 is formed at the top portion of the optical pattern and can improve viewing angle and brightness by further diffusing light reaching the second resin layer 120a in an optical display. Therefore, the polarizing plate according to this embodiment can improve light diffusion, thereby minimizing brightness loss. Although FIG. 1 shows the structure wherein the first surface 114 is flat and parallel to the flat section 113, the first surface 114 may have fine roughness or a curved surface. In the structure wherein the first surface 114 is a curved surface, the optical pattern may be realized by a lenticular lens pattern. The first surface 114 may have a width A of about 0.5 μm to about 30 μm, specifically about 2 μm to about 20 μm.

FIG. 1 shows an optical pattern which includes one flat surface formed at the top portion thereof and flat inclined surfaces and has a trapezoidal cross-section (for example, a truncated prism shape having a triangular cross-section, that is, a cut-prism shape). Alternatively, the optical patterns may be optical patterns in which the first surface is formed at the top portion thereof and the inclined surfaces are curved surfaces (for example, a stacked structure of a first resin layer having a truncated lenticular (cut-lenticular) lens shape and a second resin layer, or a truncated microlens (cut-microlens) shape). Alternatively, the engraved optical pattern may have an N-sided polygonal cross-section (N being an integer of 3 to 20), such as a rectangular shape or a square shape.

The optical patterns 111 may have an aspect ratio of about 0.3 to about 3.0, specifically about 0.3 to about 2.5, more specifically about 0.3 to about 1.5. For example, the optical patterns 111 may have an aspect ratio of about 0.3 to about 1.4, for example, about 0.3 to about 1. Within this range, the polarizing plate can improve the side contrast ratio and viewing angle in an optical display.

The optical patterns 111 may have a height H of about 40 μm or less, specifically about 30 μm or less, more specifically about 5 μm to about 15 μm. Within this range, the polarizing plate can improve the contrast ratio, viewing angle, and brightness of an optical display without causing the Moiré phenomenon.

Although FIG. 1 shows the patterned portion in which the optical patterns have the same height, the optical patterns of the patterned portion may have different heights or at least one of adjacent optical patterns may have a different height than other optical patterns. Preferably, the optical patterns have the same height.

The optical patterns 111 may have the maximum width $W_1$, $W_2$, $W_3$ or $W_4$ of about 80 μm or less, specifically about 50 μm or less. The optical patterns 111 may have the maximum width $W_1$, $W_2$, $W_3$ or $W_4$ of 5 μm to 25 μm. Within this range, the polarizing plate can improve the contrast ratio, viewing angle and brightness without causing the Moiré phenomenon.

A difference between the maximum value and the minimum value among the maximum widths of the optical patterns 111 may be about 2 μm or more, preferably about 2 μm to about 20 μm, more preferably about 2 μm to about 15 μm. Within this range, the polarizing plate can improve black visibility of an optical display.

The flat section 113 may be formed between adjacent optical patterns. Upon receiving light, the flat section 113 may diffuse the light through emission of the light, thereby improving the front contrast ratio and brightness.

A ratio of the maximum width $W_1$, $W_2$, $W_3$ or $W_4$ of the optical patterns to the width L of the flat section 113 may be about 9 or less, specifically about 0.10 to about 3, more specifically about 0.15 to about 2.6. Within this range, the polarizing plate can improve relative brightness at the front side, reduce a difference between the front contrast ratio and the side contrast ratio, and improve the contrast ratio at the same side viewing angle and the same front viewing angle without causing the Moiré phenomenon.

The flat section 113 may have a width L of about 1 μm to about 300 μm, specifically about 3 μm to about 50 μm, more specifically about 5 μm to about 20 μm. Within this range, the contrast-improving optical film can improve front brightness of an optical display.

In one embodiment, the optical patterns may have a maximum width of about 5 μm to about 25 μm and the flat section may have a width of about 3 μm to about 50 μm.

The patterned portion may have different pitches P. The pitch P is the sum of the maximum width of the corresponding optical pattern and the width of one flat section directly adjoining the corresponding optical pattern. The pitch P may be about 0.6 times or more, for example, about 0.6 times to about 5 times, the maximum width W of the corresponding optical patterns. Within this range, the polarizing plate can improve brightness and contrast ratio without causing the Moiré phenomenon.

The pitch P may range from about 5 μm to about 500 μm, specifically about 10 μm to about 25 μm. Within this range, the polarizing plate can improve brightness and contrast ratio without causing the Moiré phenomenon.

The first resin layer 110a may have a lower index of refraction than the second resin layer 120a. An absolute value of a difference in index of refraction between the first resin layer 110a and the second resin layer 120a may be about 0.20 or less, specifically about 0.05 to about 0.20, more specifically about 0.10 to about 0.15. Within this range, the contrast-improving film can provide large effects of diffusing polarized light while improving contrast ratio. In particular, the contrast-improving film having a difference in index of refraction of about 0.10 to about 0.15 can have an excellent effect of diffusing polarized light in an optical display and thus improve brightness even at the same viewing angle. FIG. 1 shows the structure wherein the first resin layer 110a has a higher index of refraction than the second resin layer 120a. Alternatively, the first resin layer 110a may have a lower index of refraction than the second resin layer 120a.

The first resin layer 110a may have an index of refraction of about 1.50 or more, specifically about 1.50 to about 1.70. Within this range, the contrast-improving film can have an excellent effect on light diffusion. The first resin layer 110a may be formed of a UV curable or thermally curable composition including at least one of (meth)acrylic, polycarbonate, silicone, and epoxy resins, without being limited thereto.

Although FIG. 1 shows the structure wherein the first resin layer 110a directly adjoins the first protective layer 200, it should be understood that the present invention is not limited thereto. The first resin layer 110a may be directly formed on the first protective layer 200 or may be formed of an adhesive resin to act as an adhesive bonding layer, which facilitates interlayer bonding. Alternatively, an adhesive layer, a bonding layer or an adhesive bonding layer may be further interposed between the first protective layer 200 and the first resin layer 110a.

Upon receiving light through a lower surface of an optical display, the second resin layer 120a can diffuse light by emitting the light in various directions depending on incident angle of light. The second resin layer 120a may be formed to directly adjoin the first resin layer 110a.

The second resin layer 120a may include a filling pattern 121 which at least partially fills the optical patterns 111. When an element is referred to as "at least partially filling" the optical patterns, the element may completely fill the optical patterns, or partially fill the optical patterns. When the filling pattern partially fills the optical patterns, the remaining space of the optical patterns may be filled with air or a resin having a certain index of refraction. Specifically, the resin may have an index of refraction which is less than or equal to that of the first resin layer and is greater than or equal to that of the first resin layer. Although not shown in FIG. 1, the optical patterns may extend in a stripe shape. Alternatively, the optical patterns may be formed in a dot shape. The term "dot" means that the optical patterns are dispersed.

The second resin layer 120a may have an index of refraction of less than about 1.52, specifically about 1.35 to less than about 1.50. Within this range, the contrast-improving film can have a large effect of light diffusion, can be easily formed, and can have large effects of diffusing polarized light while improving contrast ratio. The second resin layer 120a may be formed of a UV curable or thermally curable composition including a transparent resin. Specifically, the transparent resin may include at least one of (meth)acrylic, polycarbonate, silicone, and epoxy resins, without being limited thereto. The transparent resin may have a light transmittance of about 90% or more after curing.

The second resin layer 120a may be a non-adhesive layer exhibiting no adhesion. Alternatively, the second resin layer may be formed of a self-adhesive resin to act as an adhesive bonding layer which facilitates interlayer bonding or allows elimination of a separate polarizer protection layer upon interlayer bonding, thereby enabling thickness reduction of the polarizing plate. The self-adhesive bonding resin may be an acrylic, epoxy, or urethane resin. If the second resin layer 120a is not a self-adhesive layer, the second resin layer 120a may be bonded to the polarizing film 300 via a bonding layer. The bonding layer may be formed of a water-based bonding agent or a photocurable bonding layer.

The contrast-improving layer 100a may have a thickness of about 10 μm to about 100 μm, specifically about 20 μm to about 60 μm, more specifically about 20 μm to about 45 μm. Within this thickness range, the contrast-improving layer can be sufficiently supported on the first protective layer and can be applied to an optical display.

The first protective layer 200 is a light transmissive layer and allows light having passed through the first resin layer to pass therethrough in an optical display.

The first protective layer 200 may be a retardation film having a certain range of retardation or an isotropic optical film. In one embodiment, the first protective layer has an Re of about 8,000 nm or more, specifically about 10,000 nm or more, more specifically greater than about 10,000 nm, still more specifically about 10,100 nm to about 15,000 nm. Within this range, the first protective layer can prevent generation of rainbow spots while further diffusing light diffused through the stacked structure of the first resin layer and the second resin layer. In another embodiment, the first protective layer may be an isotropic optical film having an Re of about 60 nm or less, specifically about 0 nm to about 60 nm, more specifically about 40 nm to about 60 nm. Within this range, the first protective layer can provide good image quality through compensation for viewing angle. Herein, the term "isotropic optical film" means a film having substantially the same nx, ny and nz, and the expression "substantially the same" includes not only the case where nx, ny and nz are completely the same, but also the case where there is an acceptable margin of error between nx, ny and nz. Preferably, the first protective layer may be a retardation film having an Re of about 8,000 nm or more, specifically about 10,000 nm or more, more specifically greater than about 10,000 nm.

The first protective layer 200 may have a thickness of about 30 μm to about 120 μm, specifically about 20 μm to about 80 μm. Within this thickness range, the first protective film can be applied to an optical display. The first protective layer 200 may have a light transmittance of about 80% or more, specifically about 85% to about 95%, in the visible range. The first protective layer 200 may be formed by uniaxially or biaxially stretching an optically transparent resin. Specifically, the optically transparent resin may include at least one selected from polyester resins including polyethylene terephthalate (PET), polybutylene terephthalate, polyethylene naphthalate, polybutylene naphthalate, and the like, acrylic resins, cyclic olefin polymer (COP), cellulose ester resins including triacetylcellulose, polyvinyl acetate, polyvinyl chloride (PVC), polynorbornene resins, polycarbonate resins (PC), polyamide resins, polyacetal resins, polyphenylene ether resins, polyphenylene sulfide resins, polysulfone resins, polyether sulfone resins, polyacrylate resins, and polyimide resins. Preferably, the first protective layer includes a film formed of a polyester resin. The first protective layer may include a film formed of the resin subjected to modification. Here, modification may include copolymerization, branching, crosslinking, and modification of molecular terminals, without being limited thereto.

Although not shown in FIG. 1, the protective film may include a base film and a primer layer formed on at least one surface of the base film. The base film supports the first protective layer and has a certain range of ratio of refractive index with respect to the primer layer to increase transmittance of the base layer. Specifically, a ratio of index of refraction of the primer layer to that of the base film (index of refraction of primer layer/index of refraction of base film) may be about 1.0 or less, specifically about 0.6 to about 1.0, more specifically about 0.69 to about 0.95, still more specifically about 0.7 to about 0.9, still more specifically about 0.72 to about 0.88. Within this range, the base layer can improve transmittance of the first protective layer. The base film may have an index of refraction of about 1.3 to about 1.7, specifically about 1.4 to about 1.6. Within this range, the base layer can be used in the first protective layer, allow easy control of the index of refraction with respect to the primer layer, and improve transmittance of the first protective layer. The base film may include a film formed of the resin as set forth above. The primer layer is formed between the base layer and the first resin layer and reinforces attachment between the base film and the first resin layer. The primer layer may have an index of refraction of about 1.0 to about 1.6, specifically about 1.1 to about 1.6, more specifically about 1.1 to about 1.5. Within this range, the primer layer can be used for an optical film and has an appropriate index of refraction, as compared with the base film, thereby improving transmittance of the base layer. The primer layer may have a thickness of about 1 nm to about 200 nm, specifically about 60 nm to about 200 nm. Within this range, the primer layer can be used for an optical film, have an appropriate index of refraction, as compared with the base film, and thus improve transmittance of the base layer without embrittlement. The primer layer may be a non-urethane primer layer free from a urethane group. Specifically, the primer layer may be formed of a primer layer composition including a resin or monomer such as polyester, acryl, or the like. The primer layer may have the index of refraction as set forth above by controlling a mixing ratio (for example, a molar ratio) between these monomers. The primer layer composition may further include at least one of additives such as UV absorbers, antistatic agents, defoaming agents, surfactants, and the like.

Polarizing Film

The polarizing film 300 can polarize and transmit light received from a liquid crystal panel and may include a polarizer.

In one embodiment, the polarizing film may include a polarizer. The polarizer serves to polarize incident light and may include a typical polarizer known to those skilled in the art. Specifically, the polarizer may include a polyvinyl alcohol polarizer obtained by uniaxially stretching a polyvinyl alcohol film, or a polyene-based polarizer obtained by dehydrating a polyvinyl alcohol film. The polarizer may have a thickness of about 5 μm to about 40 μm. Within this range, the polarizer can be applied to an optical display.

In another embodiment, the polarizing film may include a polarizer and a second protective layer formed on at least one surface of the polarizer. The second protective layer can suppress intrusion of moisture into the polarizer while increasing mechanical strength of the polarizing plate. Preferably, the second protective layer may be formed between the polarizer and the contrast-improving film.

The second protective layer may include at least one of an optically transparent protective film or a protective coating layer.

When the second protective layer is of a protective film type, the protective layer may include a protective film formed of an optically transparent resin. The protective film may be formed through melting and extrusion of the resin. A process of stretching the resin may be further added. The optically transparent resin may include at least one of the resins set forth above. The protective film may be an optically transparent liquid crystal film.

When the second protective layer is of a protective coating layer type, the second protective layer can provide excellent properties in terms of adhesion to the polarizer, transparency, mechanical strength, thermal stability, moisture blocking and durability. In one embodiment, the protective coating layer may be formed of an actinic radiation-curable resin composition including an actinic radiation-curable compound and a polymerization initiator. The actinic radiation-curable compound may include at least one of a cationic polymerizable curable compound, a radical polymerizable curable compound, a urethane resin, and a silicone resin. The cationic polymerizable curable compound may be an epoxy compound having at least one epoxy group per molecule, or an oxetane compound having at least one oxetane ring per molecule. The radical polymerizable curable compound may be a (meth)acrylic compound having at least one (meth)acryloyloxy group per molecule. The epoxy compound may include at least one of a hydrogenated epoxy compound, a chain-type aliphatic epoxy compound, an alicyclic epoxy compound, and an aromatic epoxy compound. The radical polymerizable curable compound may realize a protective coating layer having excellent hardness and mechanical strength and high durability. Examples of the radical polymerizable curable compound may include a (meth)acrylate monomer having at least one (meth)acryloyloxy group per molecule and a (meth)acrylate oligomer obtained by reacting at least two functional group-containing compounds and having at least two (meth)acryloyloxy groups per molecule. Examples of the (meth)acrylate monomer may include a monofunctional (meth)acrylate monomer having one (meth)acryloyloxy group per molecule, a bifunctional (meth)acrylate monomer having two (meth)acryloyloxy groups per molecule, and a polyfunctional (meth)acrylate monomer having three or more (meth)acryloyloxy groups per molecule. Examples of the (meth)acrylate oligomer may include a urethane (meth)acrylate oligomer, a polyester (meth)acrylate oligomer, and an epoxy (meth)acrylate oligomer. The polymerization initiator can cure the actinic radiation-curable compound. The polymerization initiator may include at least one of a photocationic initiator and a photosensitizer.

The photocationic initiator may include any typical photocationic initiator known in the art. Specifically, the photocationic initiator may include an onium salt including a cation and an anion. Specifically, the cation may include diaryl iodonium such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl)[(4-(2-methylpropyl)phenyl)iodonium; triarylsulfoniums such as triphenylsulfonium and diphenyl-4-thiophenoxyphenylsulfonium; and bis[4-(diphenylsulfonio)phenyl]sulfide. Specifically, the anion may include hexafluorophosphate, tetrafluoroborate, hexafluoroantimonate, hexafluoroarsenate, and hexachloroantimonate. The photosensitizer may be any typical photosensitizer known in the art. Specifically, the photosensitizer may include at least one selected from thioxanthone, phosphorus, triazine, acetophenone, benzophenone, benzoin, and oxime photosensitizers. The polymerization initiator may be present in an amount of about 0.01 parts by weight to about 10 parts by weight relative to 100 parts by weight of the actinic radiation-curable compound. Within this range, the composition can be sufficiently cured to provide good mechanical strength and adhesion to the polarizer. The actinic radiation-curable resin composition may further include general additives such as silicone leveling agents, UV absorbers, antistatic agents, and the like. The additives may be present in an amount of about 0.01 parts by weight to about 1 parts by weight relative to 100 parts by weight of the actinic radiation-curable compound. The protective coating layer may be a liquid crystal coating layer.

The second protective layer may have the same or different retardation, material, and thickness from the first protective layer.

The second protective layer may have a thickness of about 5 µm to about 200 µm, specifically about 30 µm to about 120 µm. The second protective layer of the protective film type may have a thickness of about 50 µm to about 100 µm, and the second protective layer of the protective coating layer type may have a thickness of about 5 µm to about 50 µm. Within this thickness range, the second protective layer may be applied to an optical display.

Next, a polarizing plate according to another embodiment of the invention will be described with reference to FIG. 2. FIG. 2 is a sectional view of a polarizing plate according to another embodiment of the invention.

Referring to FIG. 2, the polarizing plate 20 according to this embodiment is substantially the same as the polarizing plate 10 except that optical patterns 111 of the polarizing plate 20 have the same maximum width and satisfy condition (ii).

Specifically, referring to FIG. 2, the polarizing plate 20 includes a contrast-improving layer 100b that includes a first resin layer 110b and a second resin layer 120b. When the width of the first flat section is indicated by $L_1$, the width of the second flat section is indicated by $L_2$, the width of the third flat section is indicated by $L_3$, . . . , the width of the $(m-3)^{th}$ flat section is indicated by $L_{m-3}$, the width of the $(m-2)^{th}$ flat section is indicated by $L_{m-2}$, the width of the $(m-1)^{th}$ flat section is indicated by $L_{m-1}$, and the width of the $m^{th}$ flat section is indicated by $L_m$ with reference to the width direction of the optical patterns 111 of the patterned portion, at least one of Equations 4-1, 4-2 and 4-3 is established and the optical patterns 111 have the same maximum width W:

$$L_{m-1} \neq L_m \qquad \text{<Equation 4-1>}$$

$$L_{m-2} \neq L_m \qquad \text{<Equation 4-2>}$$

$$L_{m-3} \neq L_m \qquad \text{<Equation 4-3>}$$

(wherein $L_{m-3}$ indicates the width of the $(m-3)^{th}$ flat section, $L_{m-2}$ indicates the width of the $(m-2)^{th}$ flat section, $L_{m-1}$ indicates the width of the $(m-1)^{th}$ flat section, $L_m$ indicates the width of the $m^{th}$ flat section, and m is an integer of 4 to 500,000). Preferably, n is an integer of 5,000 to 200,000.

In one embodiment, the flat sections of the patterned portion may have different widths.

The polarizing plate 20 may satisfy Equation 3, thereby improving black visibility while suppressing generation of mura upon non-operation of a liquid crystal display. In addition, each of the optical patterns of the polarizing plate 20 may satisfy Equation 2 and have a base angle of about 75° to about 90°, thereby improving relative brightness at the front side, improving both the front contrast ratio and the side contrast ratio at the same time, reducing a difference between the front contrast ratio and the side contrast ratio, and improving the contrast ratio at the same side viewing angle and the same front viewing angle. A difference between the maximum value and the minimum value among the widths of the flat sections 113 may be about 7 μm or more, preferably about 7 μm to about 20 μm. Within this range, the polarizing plate can improve black visibility of an optical display.

In one embodiment, the optical patterns may have a maximum width of about 5 μm to about 25 μm and the flat sections may have a width of about 3 μm to about 50 μm.

Next, a polarizing plate according to a further embodiment of the present invention will be described with reference to FIG. 3. FIG. 3 is a sectional view of a polarizing plate according to a further embodiment of the present invention.

Referring to FIG. 3, the polarizing plate 30 according to this embodiment is substantially the same as the polarizing plate 10 except that the polarizing plate 30 satisfies all of conditions (i) and (ii).

Referring to FIG. 3, the polarizing plate 30 includes a contrast-improving layer 100c that includes a first resin layer 110c and a second resin layer 120c. The polarizing plate 30 satisfies at least one of Equations 1-1, 1-2 and 1-3 and at least one of Equations 4-1, 4-2 and 4-3.

The polarizing plate 30 may also satisfy Equation 3, thereby improving black visibility while suppressing generation of mura upon non-operation of a liquid crystal display. In addition, each of the optical patterns of the polarizing plate 30 may satisfy Equation 2 and have a base angle of about 75° to about 90°, thereby improving relative brightness at the front side, improving both the front contrast ratio and the side contrast ratio at the same time, reducing a difference between the front contrast ratio and the side contrast ratio, and improving the contrast ratio at the same side viewing angle and the same front viewing angle. A difference between the maximum value and the minimum value among the widths of the optical patterns 111 may be about 2 μm or more, preferably about 2 μm to about 20 μm. Within this range, the polarizing plate can improve black visibility of an optical display. A difference between the maximum value and the minimum value among the widths of the flat sections 113 may be about 7 μm or more, preferably about 7 μm to about 20 μm. Within this range, the polarizing plate can improve black visibility of an optical display. In one embodiment, the optical patterns may have a maximum width of about 5 μm to about 25 μm and the flat sections may have a width of about 3 μm to about 50 μm.

According to the present invention, an optical display includes the polarizing plate according to the present invention. In one embodiment, the optical display may include a liquid crystal display.

The liquid crystal display may include the polarizing plate as a viewer-side polarizing plate with respect to a liquid crystal panel.

In one embodiment, the liquid crystal display may include a backlight unit, a first polarizing plate, a liquid crystal panel, and a second polarizing plate, which are stacked in the stated order, wherein the second polarizing plate may include the polarizing plate according to the present invention. The liquid crystal panel may employ a vertical alignment (VA) mode, an IPS mode, a patterned vertical alignment (PVA) mode, or a super-patterned vertical alignment (S-PVA) mode, without being limited thereto.

MODE FOR INVENTION

Next, the present invention will be described in more detail with reference to some examples. However, it should be noted that these examples are provided for illustration only and are not to be construed in any way as limiting the present invention.

EXAMPLE 1

A UV curable resin (SHIN-A T&C Co., Ltd.) was coated onto one surface of a polyethylene terephthalate (PET) film (thickness: 80 μm, Re=14,000 nm at wavelength of 550 nm, Toyobo Co., Ltd.) for a first protective layer. Then, a film having a patterned portion, which included optical patterns having the same base angle at both sides thereof and a flat section formed between the optical patterns, was applied to the coating layer to form optical patterns and a flat section on the coating layer, followed by curing, thereby forming a first resin layer including a patterned portion in which optical patterns (having a trapezoidal cross-sectional shape as shown in FIG. 2) having the same base angle at both sides, as listed in Table 1 and flat sections were alternately arranged. Here, the optical patterns had the same maximum width W. The optical patterns had the same maximum height H. The flat sections formed between the optical patterns had different widths L in the range of 5 μm to 18 μm. The first resin layer had an index of refraction of 1.59.

A UV curable resin (SHIN-A T&C Co., Ltd.) was coated onto the first resin layer to form a second resin layer having a filling pattern completely filling the optical patterns, thereby forming a contrast-improving film. The second resin layer had an index of refraction of 1.47.

A polarizer was fabricated by stretching a polyvinyl alcohol film at 60° C. to 3 times an initial length thereof and adsorbing iodine to the stretched film, followed by stretching the film to 2.5 times the stretched length of the film in an aqueous solution of boric acid at 40° C.

With a bonding agent for polarizing plates (Z-200, Nippon Goshei) applied to both surfaces of the prepared polarizer, a COP film (ZEON) was bonded to one surface of the polarizer and a PET film (thickness: 80 μm, Toyobo Co., Ltd.) was bonded to the other surface thereof.

An acryl resin adhesive was applied to one surface of the second resin layer of the contrast-improving film, and the PET film bonded to the polarizer was attached to the adhesive.

EXAMPLES 2 TO 8

Each of polarizing plates was fabricated in the same manner as in Example 1 except that the maximum height H and maximum width W of the optical patterns, the width L of the flat sections, the minimum value of P/W, and the maximum value of P/W were changed within the ranges as listed in Table 1.

EXAMPLES 9 TO 16

Each of polarizing plates was fabricated in the same manner as in Example 1 in except that the maximum height H and maximum width W of the optical patterns, the width L of the flat sections, the minimum value of P/W, and the maximum value of P/W were changed within the ranges as listed in Table 2.

EXAMPLE 17

A polarizing plate was fabricated in the same manner as in Example 1 except that the maximum height H and maximum width W of the optical patterns, the width L of the flat sections, the minimum value of P/W, and the maximum value of P/W were changed within the ranges as listed in Table 2.

COMPARATIVE EXAMPLE 1

A polarizing plate was fabricated in the same manner as in Example 1 except that the optical patterns had the same maximum width of 7 μm and the same height of 7 μm, and the flat sections had the same width of 7 μm.

Modules for liquid crystal displays were manufactured using the polarizing plates of Examples and Comparative Example.

PREPARATIVE EXAMPLE 1

Fabrication of First Polarizing Plate

A first polarizer was prepared by stretching a polyvinyl alcohol film to 3 times an initial length thereof at 60° C., and adsorbing iodine to the stretched film, followed by stretching the film to 2.5 times the stretched length of the film in an aqueous solution of boric acid at 40° C. As a base layer, a triacetylcellulose film (thickness: 80 μm) was bonded to both surfaces of the first polarizer using a bonding agent (Z-200, Nippon Goshei Co., Ltd.) for polarizing plates, thereby fabricating a first polarizing plate.

PREPARATIVE EXAMPLE 2

Fabrication of Module for Liquid Crystal Displays

The first polarizing plate of Preparative Example 1, a liquid crystal panel (PVA mode), and each of the polarizing plates prepared in Examples and Comparative Example were assembled in the stated order, thereby fabricating a module for liquid crystal displays. Each of the polarizing plates manufactured in Examples and Comparative Examples was used as a viewer-side polarizing plate.

Schematic features of the modules for liquid crystal displays are shown in Tables 1 and 2. Each of the modules for liquid crystal displays fabricated using the polarizing plates of Examples and Comparative Example was evaluated as to the following properties and evaluation results are shown in Tables 1 and 2.

(1) Side contrast ratio upon operation: A liquid crystal display was fabricated as described above. Contrast ratio of the liquid crystal display was measured in the spherical coordinates (0°, 60°) using an EZCONTRAST X88RC (EZXL-176R-F422A4, ELDIM).

(2) Evaluation of external appearance upon non-operation: A liquid crystal display was fabricated as described above. A reflection image was photographed by turning on a three-wavelength fluorescent lamp (OSRAM) placed at a height of 30 cm above the viewer-side polarizing plate. The three-wavelength fluorescent lamp was placed corresponding to the middle location on the screen of the liquid crystal display in the longitudinal direction. The intensity (I) of the reflected light was measured in pixel units using an image analysis program (ImageJ). When the outermost periphery of the three-wavelength fluorescent lamp was defined as pixel unit 0, the screen of the liquid crystal display was partitioned into a total of 250 pixels from pixel unit 0 in the longitudinal direction.

The intensity (I) of the reflected light measured on each pixel was divided by the maximum value of the intensity (I) of the measured reflected light (reflected light in pixel unit 0) to obtain a squared value in each pixel. A graph was obtained by arranging pixel unit locations on the x-axis and the obtained squared values on the y-axis, and was normalized by a statistical analysis method. From normalization, a trend line and residuals of an exponential function ($y=ae^{bx}$) were obtained. The residuals were used as the determination coefficient of black visibility. FIG. 4 is a graph for calculation of determination coefficient of black visibility upon non-operation of the optical display of Example 5, in which the pixel locations are indicated by the x-axis and the squared values are indicated by the y-axis. In FIG. 4, a blue line indicates the squared values depending upon the pixel locations and a black line indicates the normalized values. A determination coefficient of black visibility approaching 1 indicates better external appearance and a lower determination coefficient of black visibility means larger fluctuation of the intensity of reflected light providing apparent diffraction light.

TABLE 1

| Item | Example 1 | Example 2 | Example 3 | Example 4 | Example 5 | Example 6 | Example 7 | Example 8 | Comparative Example 1 |
|---|---|---|---|---|---|---|---|---|---|
| H (μm) | 7 | 7 | 7 | 7 | 5 | 5 | 5 | 5 | 7 |
| W (μm) | 7 | 7 | 7 | 7 | 5 | 5 | 5 | 5 | 7 |
| L (μm) | 5-18 | 5-16 | 5-14 | 5-12 | 5-20 | 5-18 | 5-16 | 5-14 | 7 |
| P (μm) | 12-25 | 12-23 | 12-21 | 12-19 | 10-25 | 10-23 | 10-21 | 10-19 | 14 |
| Minimum value of P/W | 1.71 | 1.71 | 1.71 | 1.71 | 2.00 | 2.00 | 2.00 | 2.00 | 2.00 |
| Maximum value of P/W | 3.57 | 3.29 | 3.00 | 2.71 | 5.00 | 4.60 | 4.20 | 3.80 | 2.00 |
| Value of Equation 3 | 2.09 | 1.92 | 1.75 | 1.58 | 2.50 | 2.30 | 2.10 | 1.90 | 1.00 |
| Base angle (°) | 86 | 86 | 86 | 86 | 86 | 86 | 86 | 86 | 86 |
| Side contrast ratio upon operation (0°, 60°) | 97 | 98 | 99 | 100 | 98 | 99 | 100 | 100 | 100 |
| Determination coefficient of black visibility upon non-operation | 0.995 | 0.994 | 0.994 | 0.986 | 0.996 | 0.994 | 0.992 | 0.992 | 0.979 |

TABLE 2

| Item | Example 9 | 10 | 11 | 12 | 13 | 14 | 15 | 16 | 17 | Comparative Example 1 |
|---|---|---|---|---|---|---|---|---|---|---|
| H (μm) | 7 | 7 | 7 | 7 | 5 | 5 | 5 | 5 | 7 | 7 |
| W (μm) | 7-10 | 7-12 | 7-9 | 7-12 | 5-8 | 5-12 | 5-8 | 5-12 | 5-10 | 7 |
| L (μm) | 5-18 | 5-18 | 5-12 | 5-12 | 5-20 | 5-20 | 5-14 | 5-14 | 7 | 7 |
| P (μm) | 15-25 | 17-25 | 14-19 | 17-19 | 13-25 | 17-25 | 13-19 | 17-19 | 12-17 | 14 |
| Minimum value of P/W | 1.50 | 1.42 | 1.56 | 1.42 | 1.63 | 1.42 | 1.63 | 1.42 | 1.2 | 2.00 |
| Maximum value of P/W | 3.57 | 3.57 | 2.71 | 2.71 | 5.00 | 5.00 | 3.80 | 3.80 | 3.4 | 2.00 |
| Value of Equation 3 | 2.38 | 2.51 | 1.74 | 1.91 | 3.07 | 3.52 | 2.33 | 2.68 | 2.83 | 1.00 |
| Base angle (°) | 86 | 86 | 86 | 86 | 86 | 86 | 86 | 86 | 86 | 86 |
| Side contrast ratio upon operation (0°, 60°) | 96 | 95 | 99 | 98 | 97 | 96 | 100 | 99 | 97 | 100 |
| Determination coefficient of black visibility upon non-operation | 0.994 | 0.992 | 0.989 | 0.986 | 0.998 | 0.995 | 0.994 | 0.992 | 0.994 | 0.979 |

As shown in Tables 1 and 2, the polarizing plates of Examples could prevent generation of mura on a screen of an optical display due to external light and can improve black visibility upon non-operation of the optical display, while improving the side contrast ratio upon non-operation of the optical display.

Conversely, although the polarizing plate of Comparative Example 1 satisfied Equation 2 to provide a high side contrast ratio upon operation of an optical display, the polarizing plate of Comparative Example 1 failed to satisfy Equation 3 and thus had a determination coefficient of less 0.985 in evaluation of external appearance upon non-operation.

It should be understood that various modifications, changes, alterations, and equivalent embodiments can be made by those skilled in the art without departing from the spirit and scope of the invention.

The invention claimed is:

1. A polarizing plate comprising: a polarizing film and a contrast-improving film formed on one surface of the polarizing film,
   wherein the contrast-improving film comprises a first protective layer and a contrast-improving layer comprising a first resin layer and a second resin layer facing each other, wherein the first resin layer has a higher index of refraction than the second resin layer,
   the first resin layer comprising a patterned portion formed on one surface thereof facing the second resin layer,
   the patterned portion comprising engraved optical patterns and a flat section between each two adjacent engraved optical patterns,
   wherein each engraved optical pattern comprises a second surface and an opening with a maximum width on a first surface, the first surface and the second surface facing each other,
   the first surface is closer to the polarizing film than the second surface, and
   each flat section is between openings of two corresponding adjacent engraved optical patterns and has a width on the first surface,
   the engraved optical patterns having a base angle α of about 75° to about 90°,
   the patterned portion satisfying Equation 2:

$$1 < P/W \leq 10 \qquad \text{<Equation 2>}$$

wherein P is a sum of the maximum width of the opening of a corresponding engraved optical pattern and the width of the flat section directly adjoining the corresponding engraved optical pattern, unit: pm, and W is the maximum width of the opening of the corresponding engraved optical pattern, unit: μm,
   The patterned portion satisfies the following condition (i) and optionally further satisfies the following condition (ii):
   (i) one engraved optical pattern has a different maximum width of the opening than an adjacent engraved optical pattern; and
   (ii) one flat section has a different width than an adjacent flat section; and
   wherein a trend line of an exponential function, fit to a scatter plot of an intensity of reflected light measured at different positions on the polarizing plate divided by a maximum value of the intensity of reflected light measured on the polarizing plate vs position on the polarizing plate, has a determination coefficient of black visibility of 0.985 or more, the determination coefficient of black visibility being calculated from residuals of data points on the scatter plot with respect to the exponential function, and
   wherein the patterned portion satisfies Equation 3:

$$1.5 < [P/W]\max/[P/W]\min < 10 \qquad \text{<Equation 3>}$$

wherein [P/W]max is a maximum value of P/W represented by Equation 2 and [P/W]min is a minimum value of P/W represented by Equation 2.

2. The polarizing plate according to claim 1, wherein the flat sections have the same width, and the engraved optical patterns have the same height.

3. The polarizing plate according to claim 2, wherein the maximum width of the opening of the engraved optical patterns is about 5 μm to about 25 μm and the width of the flat sections is about 3 μm to about 50 μm.

4. The polarizing plate according to claim 2, wherein a difference between a maximum value and a minimum value among the maximum widths of the opening of the engraved optical patterns ranges from about 2 µm to about 20 µm.

5. The polarizing plate according to claim 1, wherein the patterned portion further satisfies condition (ii), and the engraved optical patterns have the same height.

6. The polarizing plate according to claim 5, wherein the maximum width of the opening of the engraved optical patterns is about 5 µm to about 25 µm and the width of the flat sections is about 3 µm to about 50 µm.

7. The polarizing plate according to claim 5, wherein a difference between a maximum value and a minimum value among the widths of the flat sections ranges from about 7 µm to about 20 µm.

8. The polarizing plate according to claim 1, wherein a pitch of the patterned portion is about 1 time to about 5 times the maximum width of the opening of the engraved optical patterns.

9. The polarizing plate according to claim 1, wherein the engraved optical patterns have an aspect ratio of about 0.3 to about 3.0.

10. The polarizing plate according to claim 1, wherein the engraved optical patterns comprise optical patterns each having at least one inclined surface connected to the first surface, the inclined surface being a flat surface or a curved surface.

11. The polarizing plate according to claim 1, wherein an absolute value of a difference in index of refraction between the first resin layer and the second resin layer is about 0.20 or less.

12. The polarizing plate according to claim 1, wherein, in the contrast-improving film, the second resin layer directly adjoins the first resin layer and the first resin layer directly adjoins the first protective layer.

13. The polarizing plate according to claim 1, wherein the first resin layer or the second resin layer is an adhesive bonding layer and the contrast-improving film is directly formed on the polarizing film.

14. The polarizing plate according to claim 1, wherein the first protective layer has an Re of about 8,000 nm or more at a wavelength of 550 nm, as represented by Equation A:

$$Re=(nx-ny)\times d \qquad \text{<Equation A>}$$

wherein nx and ny are indices of refraction in slow and fast axes of the first protective layer at a wavelength of 550 nm, respectively, and d is a thickness, unit: nm, of the first protective layer.

15. The polarizing plate according to claim 1, wherein the first protective layer is formed of a polyester resin.

16. The polarizing plate according to claim 1, wherein the polarizing film comprises a polarizer and a second protective layer formed on one surface of the polarizer, the second protective layer being formed between the polarizer and the contrast-improving film.

17. A liquid crystal display comprising the polarizing plate according to claim 1.

\* \* \* \* \*